United States Patent
Martin et al.

(10) Patent No.: US 6,615,795 B2
(45) Date of Patent: Sep. 9, 2003

(54) INTERNAL COMBUSTION ENGINE

(75) Inventors: David James Martin, West Sussex (GB); David Vizard, Colton, CA (US)

(73) Assignee: Anthony Louis Zalkin (GB)

( * ) Notice: Subject to any disclaimer, the term of this patent is extended or adjusted under 35 U.S.C. 154(b) by 0 days.

(21) Appl. No.: 10/086,789

(22) Filed: Mar. 1, 2002

(65) Prior Publication Data

US 2002/0185105 A1 Dec. 12, 2002

Related U.S. Application Data

(63) Continuation of application No. PCT/GB00/03365, filed on Aug. 31, 2000.

(30) Foreign Application Priority Data

Sep. 1, 1999 (GB) .............................. 9920666

(51) Int. Cl.[7] .............................. F02F 1/42; F02B 31/08

(52) U.S. Cl. ...................... 123/308; 123/315; 123/432

(58) Field of Search .............................. 123/308, 193.5, 123/432, 315

(56) References Cited

U.S. PATENT DOCUMENTS

| | | | |
|---|---|---|---|
| 3,020,896 A | * | 2/1962 | Meurer et al. .............. 123/308 |
| 4,354,463 A | | 10/1982 | Otani et al. ................. 123/308 |
| 4,703,734 A | * | 11/1987 | Aoyama et al. ............ 123/432 |
| 4,972,814 A | * | 11/1990 | Matsuki et al. ............. 123/308 |
| 5,007,392 A | | 4/1991 | Niizato et al. ......... 123/193 H |
| 5,056,486 A | * | 10/1991 | Johannes .................... 123/432 |
| 5,138,989 A | * | 8/1992 | Fraidl et al. .............. 123/193.5 |
| 5,269,270 A | * | 12/1993 | Suzuki et al. ............... 123/310 |
| 5,596,965 A | * | 1/1997 | Nagata ....................... 123/308 |
| 6,098,590 A | * | 8/2000 | Kutschera et al. .......... 123/308 |

FOREIGN PATENT DOCUMENTS

| | | |
|---|---|---|
| DE | 755 495 | 10/1954 |
| DE | 195 40 398 | 3/1997 |
| EP | 0 396 676 | 11/1990 |
| EP | 0 444 018 | 8/1991 |
| EP | 0 723 074 | 7/1996 |
| FR | 783.318 | 7/1935 |
| GB | 2 172 051 | 9/1986 |
| GB | 2 215 777 | 9/1989 |
| JP | 57091320 | 6/1982 |
| JP | 59054732 | 3/1984 |
| JP | 59099026 | 6/1984 |
| WO | WO 90/05842 | 5/1990 |

* cited by examiner

Primary Examiner—Tony M. Argenbright
Assistant Examiner—Arnold Castro
(74) Attorney, Agent, or Firm—St. Onge Steward Johnston & Reens LLC

(57) ABSTRACT

The present invention seeks to provide further methods to generate swirl and reduce cross flow in spark ignition internal combustion engines having two inlet and two exhaust valves per cylinder head, without the use of additional moving parts. According to one aspect of the present invention there is provided an internal combustion engine comprising a cylinder head having formed therein first and second intake valves for admitting combustion charge into a combustion chamber and one or more exhaust valves for expelling combustion products from the combustion chamber, the intake valves being disposed on one side of the cylinder head and the exhaust valve or valves being disposed on an opposite side of the cylinder head, each of which valves comprises a port and an associated valve head permitting opening and closing of the port, characterized in that the engine is adapted so as to admit a greater flow of combustion charge through the first intake valve as compared to the second intake valve, the differential flow between the two intake valves imparting a swirl to the combustion charge as it enters the combustion chamber, the swirl direction generally corresponding to circumferential charge flow in the combustion chamber from the first intake valve, past the exhaust valve or valves and thence to the second intake valve.

12 Claims, 9 Drawing Sheets

PRIOR ART

Shallower and flatter approach angle.

Deeper and steeper approach angle.

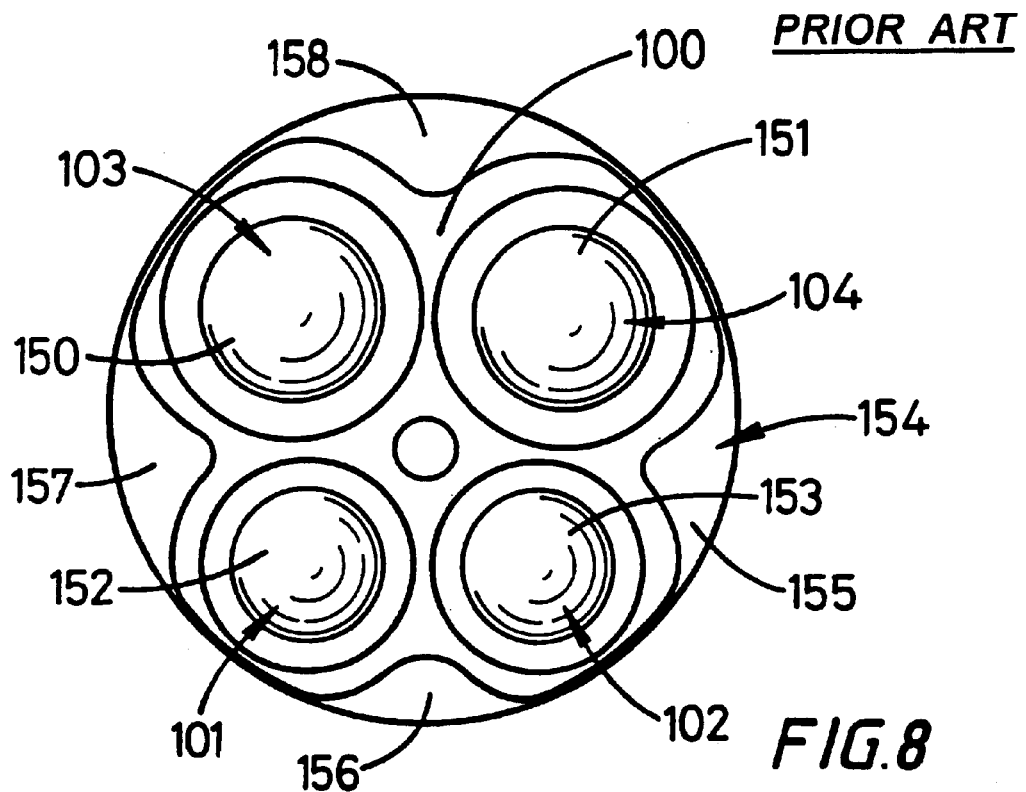
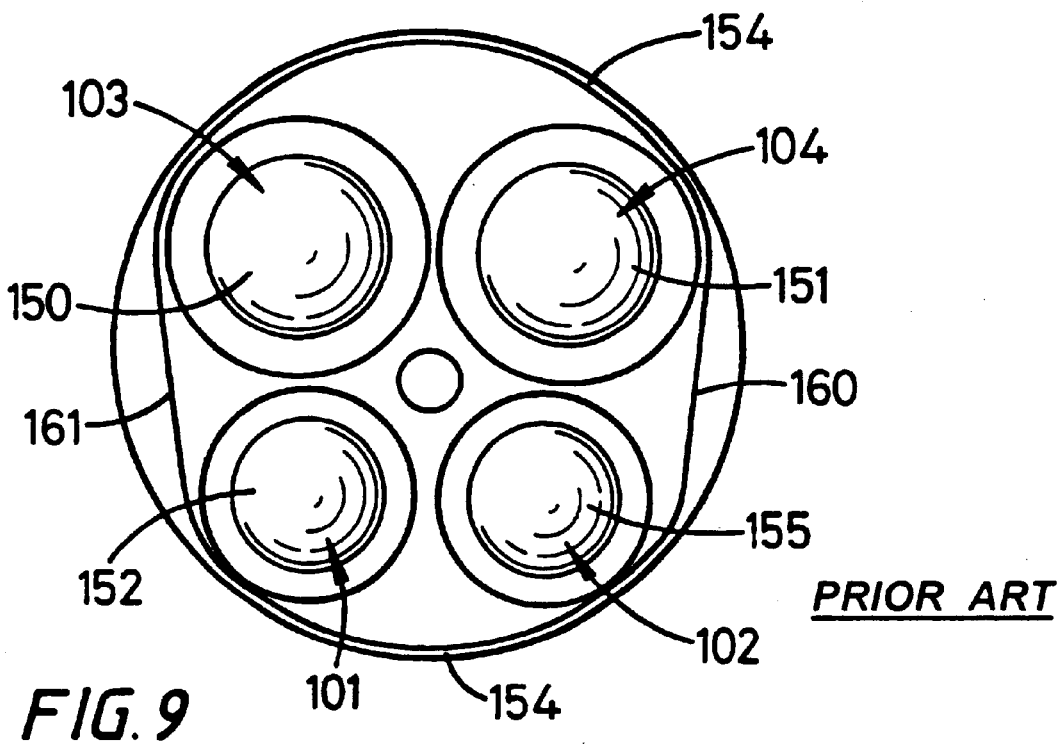

INTERNAL COMBUSTION ENGINE

This application is a continuation of pending International Application PCT/GB00/03365 filed on Aug. 31, 2000 and published Mar. 8, 2001, which designates the United States and which claims priority from British Application 9920666.6 filed on Sep. 1, 1999.

FIELD OF THE INVENTION

The present invention relates to the field of internal combustion engines, and in particular to methods of increasing the efficiency of the cylinder head charging, fuel burn and subsequent exhaust during a combustion cycle.

BACKGROUND OF THE INVENTION

Classic internal combustion engines have two valves per cylinder. One valve, the intake valve, admits a fuel/air mixture into the cylinder head. The other, exhaust valve, permits expulsion of combustion products from the cylinder head and thence to an exhaust. During combustion events the cylinder head valves are generally both closed. Once combustion has occurred and the piston head has been forced downwards in the cylinder, the exhaust valve is opened and burnt mixture is expelled from the cylinder head by return motion of the piston head. The exhaust valve is closed as the piston reaches the top of the cylinder. The intake valve is opened so that movement of the piston back down in the cylinder sucks air/fuel mixture into the cylinder head, ready for the next spark ignition to create combustion of the air/fuel mixture.

The common internal combustion engine can be likened to a complex thermodynamic air pump. The greater the rate that an engine can pass air, the greater the potential for generating more power. However, air consumption alone does not guarantee power. Unless the air/fuel charge entering the cylinder head is burned effectively, the torque and consequently the power output of the engine as a whole will not reach its full potential.

One way of increasing the efficiency of air flow through an engine is increasing the number of valves. Four valve per cylinder head engines are common and permit a greater through flow for a given valve dimension. There are two intake valves and two exhaust valves, which provide increased air flow by providing a greater "curtain area" for a given valve diameter. Curtain area is the cylindrical area swept by the valve head between its closed an open configurations, in other words the multiple of valve lift and valve circumference. For a constant valve head area, a cylinder head formed with one intake valve head will have a reduced curtain area compared to a cylinder head formed with two smaller intake valve heads having the same total valve head diameter. This is because the total circumference of the two smaller heads will be greater than that of one large valve head. The advantage of the greater circumference of the two smaller valves persists through out the valve lift range from closed up to a lift equal to 0.25 of the valve diameter. From this point on, the advantage over a single valve diminishes until the single valve reaches a lift of 0.25 of the valve diameter.

The four-valve cylinder head has a further advantage. The valve area which can be accommodated in a circular section cylinder head is greater with four valves than with two valves. The previously discussed circumferential curtain advantage plus this area advantage gives the four-valve head its superior air breathing qualities and consequently it's potential to produce greater power.

However, One of the principle functional disadvantages of a 4-valve cylinder head as compared with a 2-valve head is that the 4-valve head lacks much of the air/fuel mixture motion generated during induction of the fresh charge into the 4-valve head. FIG. 1 illustrates the typical mixture motion generated by a well-designed 2-valve cylinder head 1 provided in a roof thereof with an inlet valve 3 and an exhaust valve 4. As the charge (indicated by arrows) enters the combustion chamber 2, so a swirling motion is set up. This motion, if aggressive enough, persists through out the compression stroke and on into the combustion process. The swirl effectively speeds the combustion process thus producing a higher-pressure rise and consequently more torque. This mixture motion typically allows a 2 valve per cylinder engine to produce more low rpm torque for a given size of engine than its 4-valve counterpart. At low engine speed the fact that a 2-valve engine may have less breathing area presented to the cylinder is of little consequence because the time available to fill the cylinder is more than adequate. As rpm rises so the need for greater breathing capability increases. A 4 valve per cylinder automotive engine typically exhibits its advantage in terms of breathing (or volumetric efficiency defined as the amount of air drawn into the cylinder divided by the cylinder displacement) at above about 4000 to 4500 rpm.

FIG. 1 demonstrates that the swirl of a two-valve engine's cylinder head is principally an inherent characteristic of the basic design. A 4-valve head is not without its own characteristic motion. This motion is most commonly known as tumble. Tumble is generated because the intake valve is offset to one side of the cylinder head. Hence air/fuel mixture entering the head is presented with a large free space at the other side of the cylinder head. The mixture admitted is predominantly drawn over the top of the open valve head towards the other side of the cylinder head. The mixture then 'tumbles' down towards the piston head, back across the piston head and back up towards the intake valves. Although tumble helps produce an accelerated combustion process at low rpm, it generally fails to match the effectiveness of the two-valve design. Four-valve cylinder heads usually have inclined valves, in which the plane occupied by the valve heads at any point in time is angled with respect to a top face of the cylinder head (or the engine block face). This configuration leads to another disadvantage of typical 4 valve cylinder heads. This is the phenomenon of 'cross flow'. Cross flow arises where fuel/air mixture entering the cylinder head travels directly from the intake valve to the exhaust valve and out of the cylinder head. This can, of course, only occur if both intake and exhaust valves are open at the same time. This happens between a period starting just before top dead centre at the end of the exhaust stroke to just after top dead centre on the intake stroke. During this period, when both valves are open, there is a tendency for some of the fresh charge to exit the cylinder via the still open exhaust valve.

Cross flow causes an increase in fuel consumption and unwanted exhaust emissions, mostly in the form of unburned hydrocarbons. The effects of cross flow are normally countered by shortening the duration of the valve opening events to cut the overlap. However, if duration is shortened as far as is often needed, much of the power advantage of a 4-valve design may be lost.

One method of generating swirl in 4-valve engines is to disable one valve while the engine is at lower RPM. FIG. 2 is a schematic view from above of a 4-valve cylinder head 5, provided with two inlet valves 6,7 and two exhaust valves 8,9. The effect of blocking one inlet valve 7 is to cause the 4-valve engine to function as a 2-valve engine at low rpm. The second intake 7 port is typically deactivated by means of a closed butterfly valve 10. As engine rpm rises, the need for aggressive mixture motion decreases but the requirement for strong airflow increases. Hence at higher revolutions, usually in the region of 3500 rpm, the butterfly opens and allows the second valve port to supply the engine's air demand.

The foregoing method is not the only technique for introducing swirl into a 4-valve engine. Other techniques are used in the design and manufacture of Diesel engines that need high swirl values for effective combustion. A significant problem with the known methods of inducing swirl in 4-valve engines is the requirement for a complex mechanical arrangement for opening and closing the butterfly valve according to the threshold rpm for efficient operation.

A recent development, which is a simplification of 4 valve per cylinder engines, is the 3 valve per cylinder engine. In such engines each cylinder has two intake valves and a single exhaust valve. This type of cylinder head valve arrangement does not, however, generate any significant swirl.

GB-A-2215777 (Honda) discloses an engine having differently sized intake valves, with a helical feed angle to develop swirl. The smaller intake valve is provided with a throttle which is activated at low revs. The technology relates to direct injection diesel engines. One intake valve is stated to be small than the other in order to minimize flow 'shock' on closure of the smaller valve at low revs.

A number of patent documents have disclosed differential sizing of intake valves for producing combustion chamber swirl. In addition the use of differential valve timing is known for the same purpose. For example:

U.S. Pat. No. 5,007,392 (Honda) discloses an engine in which there are differently-sized intake valves and differently-sized exhaust valves, primarily for improving volumetric engine and through-flow efficiency, and in addition for generating swirl. Variable valve timing is also used to impart swirl.

WO 90/05842 (Johannes) discloses an engine in which intake valves have respectively lateral and oblique entry directions, in order to generate a vortex. The respective cross-sections of the intake valves differ in order to obtain different velocities through the ports. The smaller, high velocity, port is opened first at low engine speeds. The port throats are provided with throttles to allow incremental increasing opening of the ports so as to produce the optimum cylinder charge at any revs. In the case of multiple intake valves, the intake valve most remote from the exhaust valve is opened first, so as to reduce cross-flow.

JP-A-59-099026 (Mazda) discloses a cylinder head in which the intake valves are differently sized so as to induce swirl. The exhaust valves are symmetrically differently sized, the valve timing overlap between large intake and large exhaust valves being greater than that between the smaller valves.

JP-A-57-091320 (Suzuki) discloses a cylinder head in which two differently sized intake ports are provided, the sizing imparting swirl. The invention relates to the use of a single rocker arm to open both intake valve heads by use of a rotating cam acting on the rocker arm.

The present invention seeks to provide, inter alia, further methods to generate swirl and reduce cross flow in spark ignition internal combustion engines having at least two inlet valves per cylinder and, in a preferred aspect of the invention, engines having 2 inlet and 2 exhaust valves per cylinder head, without the use of additional moving parts.

According to one aspect of the present invention there is provided an internal combustion engine comprising a cylinder head having formed therein first and second intake valves for admitting combustion charge into a combustion chamber and one or more exhaust valves for expelling combustion products from the combustion chamber, the intake valves being disposed on one side of the cylinder head and the exhaust valve or valves being disposed on an opposite side of the cylinder head, each of which valves comprises a port and an associated valve head permitting opening and closing of the port, characterized in that the engine is adapted so as to admit a greater flow of combustion charge through the first intake valve as compared to the second intake valve, the differential flow between the two intake valves imparting a swirl to the combustion charge as it enters the combustion chamber, the swirl direction generally corresponding to circumferential charge flow in the combustion chamber from the first intake valve, past the exhaust valve or valves and thence to the second intake valve.

The invention can be applied to any engine which has plural intake valves, i.e. 3 or more valves per cylinder head. This includes three valve per cylinder engines in which there are two intake valves and a single exhaust valve. However the invention is likely to find most common application in 4 valve engines. Hence, in a preferred aspect of the invention there are first and second exhaust valves and the engine is a four valve per cylinder head engine.

Typically an intake conduit carrying mixture to at least the first intake valve is configured to provide an airflow momentum which directs mixture into the cylinder head from the first intake valve across the cylinder to an opposite side of the cylinder head under the first exhaust valve.

One benefit of introducing or enhancing swirl is improved low speed torque, an area in which prior art 4-valve engines are notably deficient.

The engine may be adapted to produce a differential flow by the first intake valve's port and valve head combination being shaped and configured to admit a greater flow of charge than the second valve's port and valve head combination, and/or the second intake valve's port and valve head combination being shaped and configured to admit a relatively reduced flow of charge.

The flow rate through the first intake valve may be increased by the engine being configured so that a curtain area of the first intake valve when open is larger than a corresponding curtain area of the second intake valve when open.

In one embodiment of this aspect of the invention, the shaping and configuring comprises forming the first intake valve with a larger port bore and valve head diameter than those of the second intake valve. A charge admitted via the smaller intake valve will have the direction of its motion influenced by the higher flow from the larger intake valve. In a 4 valve configuration this tends to turn the airflow admitted by the smaller valve away from the distal second exhaust valve. As a consequence, the likelihood of unburnt combustion charge immediately exiting via the exhaust valve during the open valve overlap period is reduced. This improves engine efficiency because less un-burnt fuel is expelled from the combustion chamber during induction of the fuel charge. The differential in valve port bores will depend upon the particular engine characteristics. However, a preferred range is exemplified by the first inlet valve having a diameter up to 70% larger than the second inlet valve.

In another aspect of the invention there is provided a method of modifying a conventional engine by re-sizing the intake valves and/or the exhaust valves, the re-sizing causing one intake valve to be larger than the other and/or one exhaust valve to be larger than the other, thereby to produce the swirl effect in the working engine as hereinbefore described. The re-sizing may comprise insertion of differentially-sized valve seat inserts and replacement of the standard valve heads with valve heads having a diameter corresponding to re-sized valve seats. Enlargement of the valve ports may be achieved by reboring.

In another aspect of the invention, the engine is adapted by one charge conduit to the first intake valve having a shallower angle of approach to the valve than another charge conduit to the second intake valve, the said one charge conduit thereby directing charge flow admitted through the first intake valve laterally across the combustion chamber and the relatively steep another charge conduit thereby directing charge flow admitted through the second intake valve downwards into the combustion chamber.

Shaping of the conduit (or throat) may be used alone, or preferably to enhance the basic action developed by the differential intake port flow rates. For example, if the conduit to the larger intake port has a shallower approach than the conduit feeding the smaller intake valve, fuel/air charge is encouraged to be admitted into the cylinder head laterally across the roof of the cylinder head.

The conduit to the smaller intake port may have a steeper approach. This encourages greater flow downward into the combustion chamber. This more downward and lesser flow volume from the smaller intake port imparts a tendency in the charge flow out of the smaller intake port to turn away from the distal exhaust valve. This further reduces any tendency for cross over loss by spilling of the charge out of the proximal first or distal second exhaust ports during overlap.

In the 4 valve configuration, the first exhaust valve may have a smaller port bore and valve head diameter than the second exhaust valve. Since the smaller first exhaust valve is directly opposite the large intake valve, there is less opportunity for the incoming charge to exit via the exhaust valve than if the first exhaust valve were the same size or larger than the second exhaust valve. As combustion charge spirals into the combustion chamber it will tend to pass over the combustion chamber side of the distal second exhaust port's valve head, thereby avoiding being drawn out of that exhaust valve when the exhaust valve is open during valve opening overlap.

It has been found that further swirl motion enhancements can be achieved by shaping of the combustion chamber roof. A conventional prior art chamber roof configuration is shown in FIG. 12. Some combustion chambers may have even simpler forms, and the most basic in common usage is generally according to that shown in FIG. 13. None of these chamber forms, or those that are essentially hybrids of those shown in FIGS. 12 and 13, is capable of improving mixture motion beyond natural tumble. It is an object of the present invention to provide combustion chamber shaping which does enhance swirl and reduce cross flow.

Hence, according to another aspect of the invention a cylinder head wall portion which forms a roof of the combustion chamber may accommodate therein the intake and exhaust valves, which roof is provided with shrouding around the first intake valve, the shrouding providing a relatively broad flow path out of the first intake valve at a region of the first intake valve proximal to the exhaust valve or valves and a relatively narrow flow path out of the first intake valve at a region of the first intake valve proximal to the second intake valve, the charge flow thereby being encouraged in the swirl direction and discouraged in an anti-swirl direction.

In yet another aspect of the invention there may be provided an engine as hereinbefore described wherein a cylinder head wall portion which forms a roof of the combustion chamber accommodates therein the intake and exhaust valves, which roof is provided with shrouding around the second intake valve, the shrouding providing a relatively broad flow path out of the second intake valve at a region of the second intake valve proximal to the first intake valve and a relatively narrow flow path out of the second intake valve at a region of the second intake valve proximal to the exhaust valve or valves, the charge flow thereby being encouraged in the swirl direction and discouraged in an anti-swirl direction.

By applying a moderate degree of shrouding the free path of the charge passing through the port can be constricted or opened. This effectively modifies the curtain area to induce a differential flow through an individual valve, which leads to the development or enhancement of swirl. Naturally where the curtain area is relatively large, i.e. where the shrouding clearance is greatest, flow is encouraged. Where the curtain area is reduced, i.e. clearance is low, flow is reduced. Hence overall flow develops in the direction of greater clearance, developing a swirl.

Advantage of the same effect may be taken at the smaller second intake valve. This effect is produced in the same manner as the larger first intake to influence mixture flow in the swirl direction.

Beyond enhancing swirl, the motion imparted to the incoming charge by the valve shrouding tends to reduce cross over loss during the overlap period at the end of the exhaust stroke and the beginning of the intake stroke. Because a smaller exhaust valve faces the predominant flow from the larger first intake valve, so there is less exhaust valve curtain area directly aligned through which incoming charge may exit the chamber. As the incoming charge enters the cylinder it spirals down the bore of the combustion chamber. As such the charge has a tendency to pass over the combustion chamber side of the second, larger exhaust port rather than exit through the curtain area between the valve head and valve seat in the port.

Further reductions in cross flow can be achieved by providing a step in the combustion chamber roof portion that separates the intake and exhaust valves. The step may be formed by recessing of the exhaust valve or valves.

Hence, in another aspect of the invention there may be provided an engine as hereinbefore described wherein respective circumferential surfaces of the intake and exhaust valve ports form valve seats for the associated valve heads, wherein the valve seat of the first exhaust port is recessed into a cylinder head roof relative to the valve seat of the first intake port so that the valve seat of the first exhaust port is axially offset in the cylinder head with respect to the valve seat of the first intake port. The recess forms a step that shields the exhaust valve from the entering fuel charge flow. Hence, for cross over to take place the charge would have to follow a tortuous path, which is not therefore favoured.

In a further aspect of the invention there may be provided an engine as hereinbefore described wherein respective circumferential surfaces of the intake and exhaust valve ports form valve seats for the associated valve heads, wherein the valve seat of the second exhaust port is recessed into a cylinder head roof relative to the valve seat of the second intake port so that the valve seat of the second exhaust port is axially offset in the cylinder head with respect to the valve seat of the second intake port.

In another aspect of the invention there may be provided an engine as hereinbefore described, characterized in that a deflecting feature is formed on a cylinder head wall portion separating one of the intake valves from one of the exhaust valves, the deflecting feature serving to deflect the flow of combustion charge entering the combustion chamber via the intake valve downwards into the combustion chamber and away from the exhaust valve.

As the fuel/air charge enters the chamber it is turned to direct it in a more downward direction than would be the case without the deflector portion of the chamber being present. Additionally, because of the stepped form of the chamber, the exhaust valve is recessed from the level of the intake valve and offset with respect to the path of mixture flow in through the intake, so the charge entering the cylinder is less likely to exit out of a still open exhaust port. Preferably the extent of the exhaust port recessing relative to the intake port would be between approximately 20 and 50% beyond the normal countersink present around a valve seat. In one aspect of the invention the exhaust port is recessed to between 5 and 20% of the exhaust valve port/head diameter.

In yet another aspect of the invention the engine is adapted to provide greater flow through the first intake valve by the provision of differential valve timing. Hence according to yet another aspect of the invention there may be provided an engine as hereinbefore described wherein the engine is adapted to provide greater flow through the first valve by the provision of differential valve timing means which act to open the first intake valve before the second intake valve so that a low pressure region is created adjacent the first intake valve, which low pressure region draws subsequent charge flow from the second intake port toward the first intake port, thereby imparting a swirl to the charge entering the combustion chamber.

In another aspect of the invention a valve opening mechanism may be configured to open the first intake valve head a further distance than the second intake valve head, thereby increasing the first intake valve's curtain area to induce engine swirl. The configuration may comprise providing the first intake valve with larger actuation cams than actuation cams of the second intake valve.

Differential valve timing may be achieved by simply altering the relative rotational positions of valve actuation cams for the respective intake valves. In a preferred embodiment the differential timing means is arranged to open the first intake valve before the second intake valve, and to close the second intake valve before the first intake valve.

It is within the scope of the invention to provide a method of improving the efficiency of a conventional engine by a method comprising reconfiguring the conventional engine to correspond with any engine according to the invention as hereinbefore described.

BRIEF DESCRIPTION OF THE DRAWINGS

Following is a description by way of example only and with reference to the drawings of methods of putting the present invention into effect.

FIG. 8 is a view from the underside of one prior art cylinder head roof portion.

FIG. 9 is a view from the underside of another prior art cylinder head roof portion.

DETAILED DESCRIPTION OF THE DRAWINGS

Figure 1:
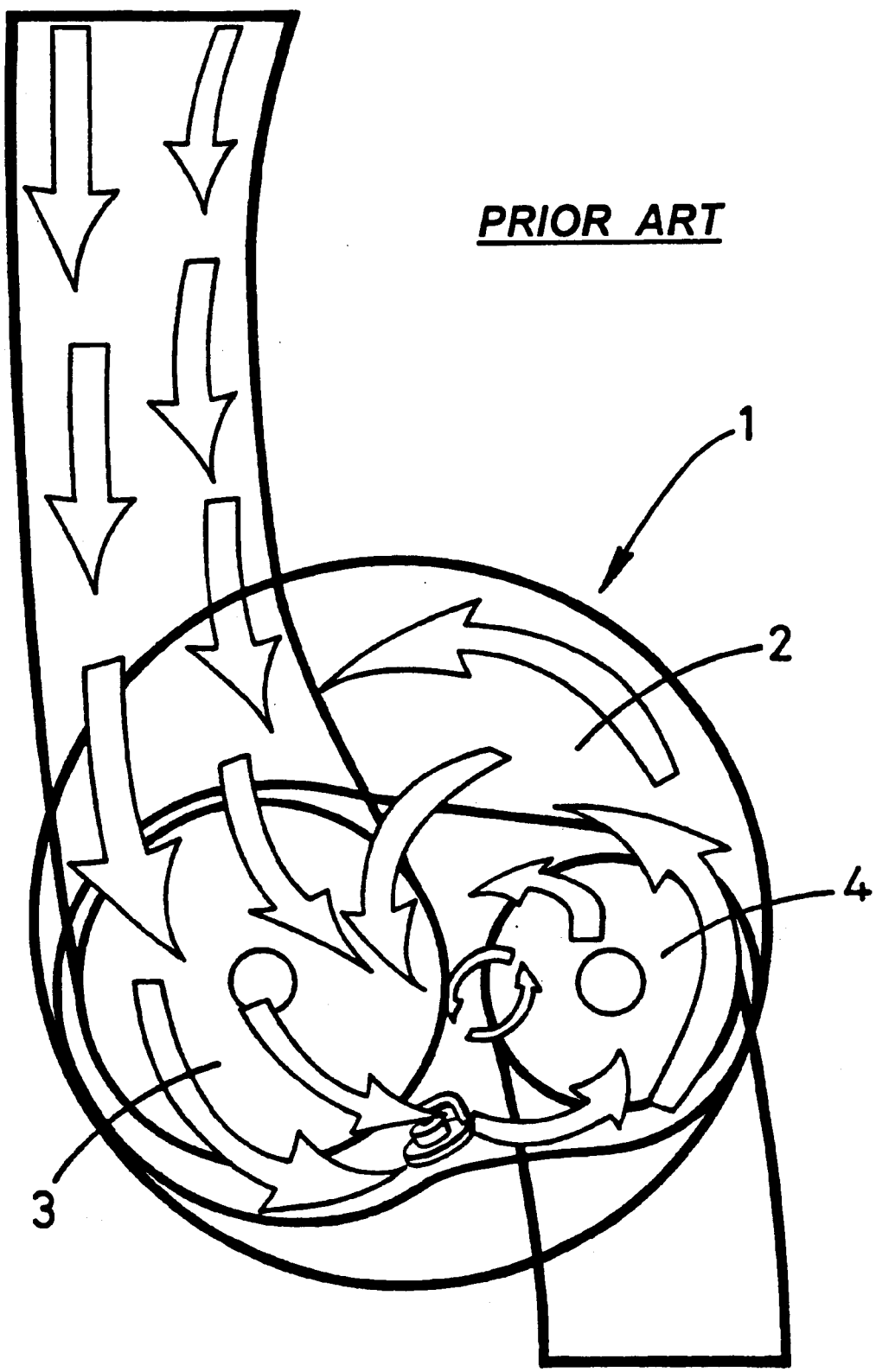
FIG. 1 is a schematic diagram showing air/fuel mixture paths for gas entering a two-valve cylinder that develops a swirl.
Figure 2:
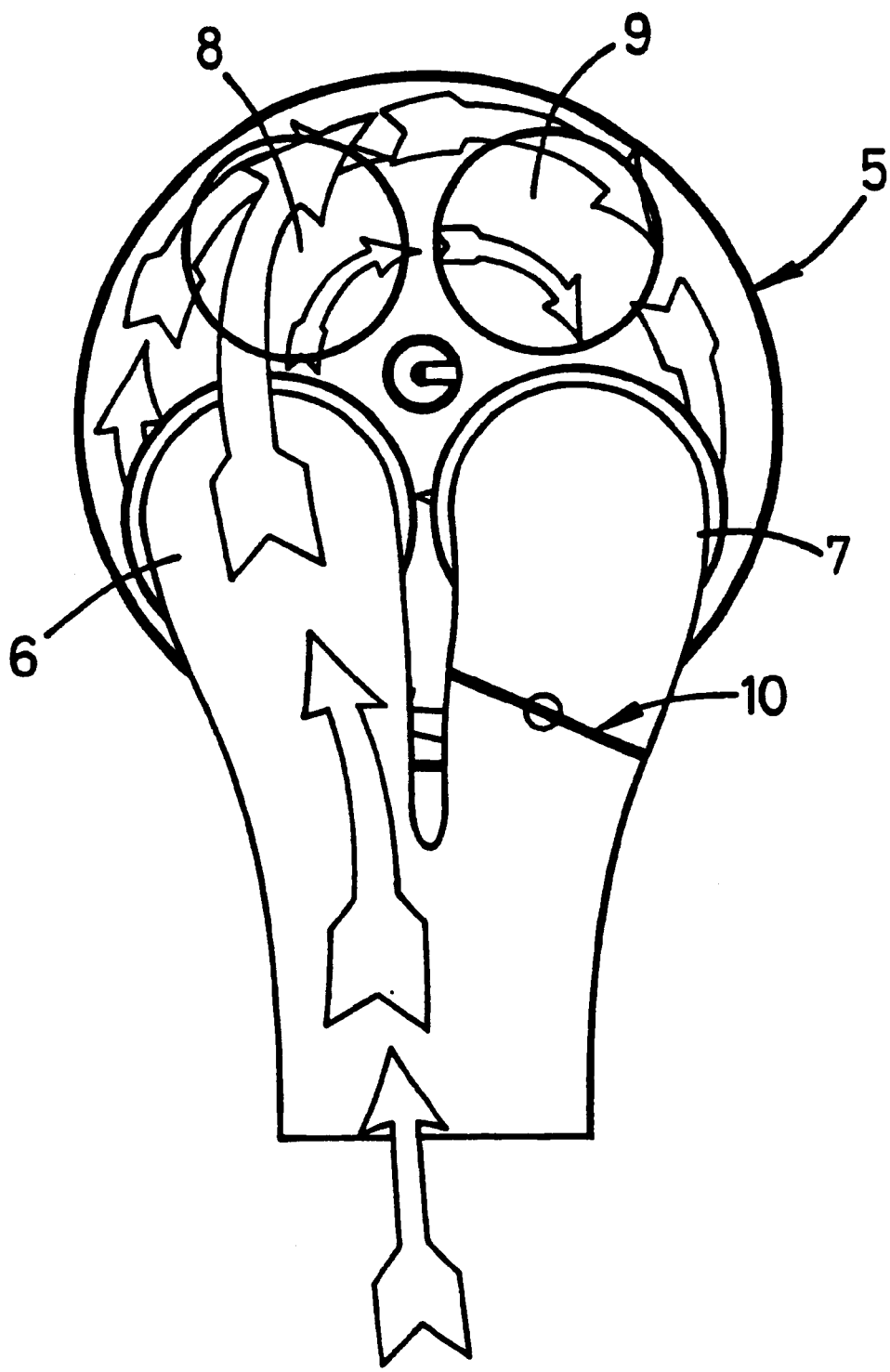
FIG. 2 is schematic representation of a section through the cylinder head of a prior art four-valve engine having one selectively blockable intake valve.
Figure 3:
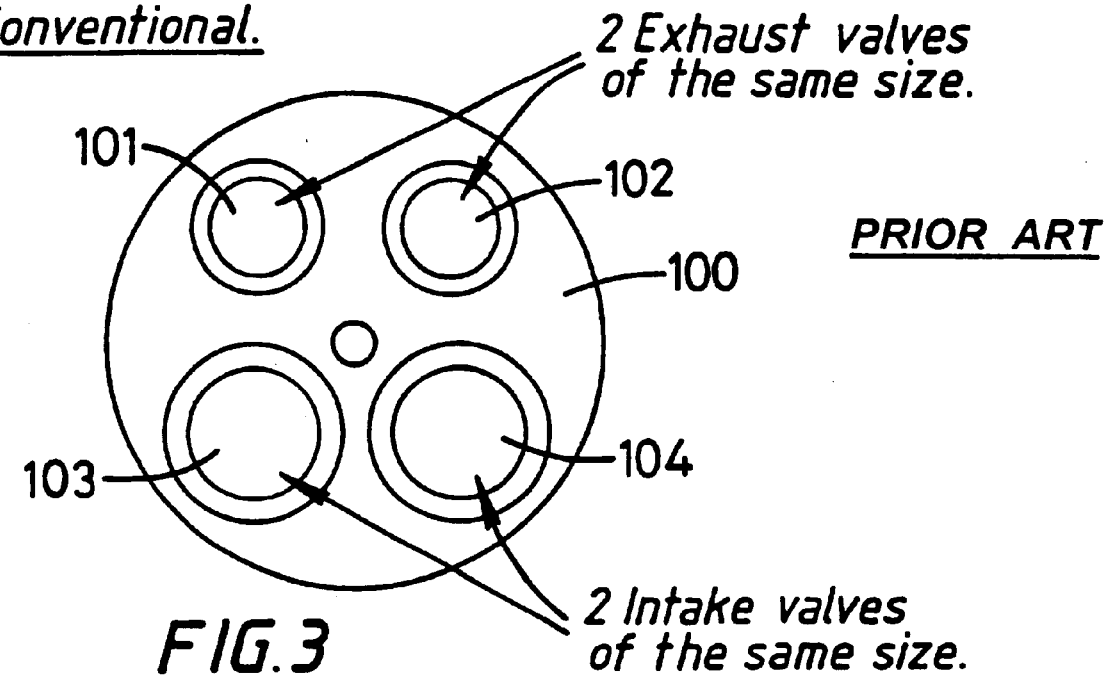
FIG. 3 is a section through a top end of a prior art cylinder head.

FIG. 3 is a sectional view across a conventional four-valve cylinder head 100. Two top quadrants of the cylinder head are occupied by two equally sized exhaust valves 101,102 each comprising a valve head accommodated in an exhaust port. Two bottom quadrants of the cylinder head 100 are occupied by two equally sized intake valves 103,104 each comprising a valve head accommodated in an intake port. The intake valves are of equal size, but larger in diameter than the exhaust valves.

Figure 4:
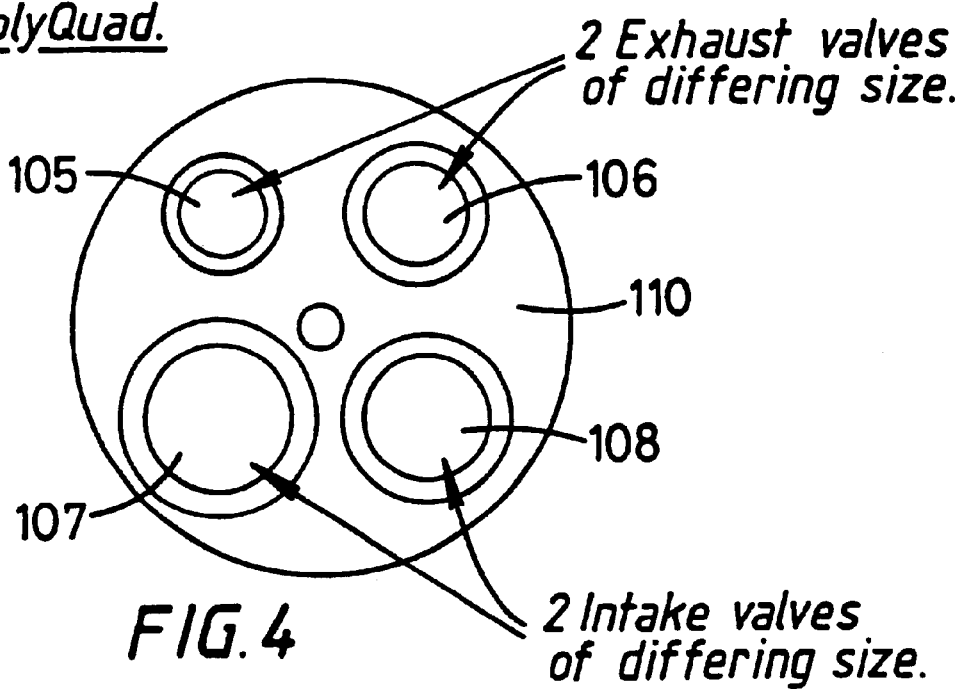
FIG. 4 is a section through the top end of a cylinder head according to the present invention.

In contrast a cylinder head arrangement 110 according to the present invention is shown in FIG. 4. As with the conventional arrangement of FIG. 3, the top two valves 105,106 are exhaust valves and the bottom two valves 107,108 are intake valves. However, one 107 of the intake valves is significantly larger in diameter than the other 108. A valve head of the larger intake valve is correspondingly larger than the valve head of the smaller intake port. In addition, the exhaust valve 105 closest to the large intake valve 107 is smaller in diameter than the other exhaust valve 106. Naturally the valve head of the exhaust valve closest to the large intake valve is correspondingly smaller than the valve head of the other exhaust valve. In a successful implementation of the invention a current Aston Martin Lagonda (trade name) 5.3 liter V8 engine, each cylinder head valve arrangement was modified to provide a 1.650 inch (41.9 mm) diameter large intake valve and a 1.450 inch (36.8 mm) diameter smaller intake valve. The engine was modified to provide a 1.400 inch (35.6 mm) diameter large exhaust valve and a 1.200 inch (30.5 mm) diameter smaller exhaust valve.

Figure 5:
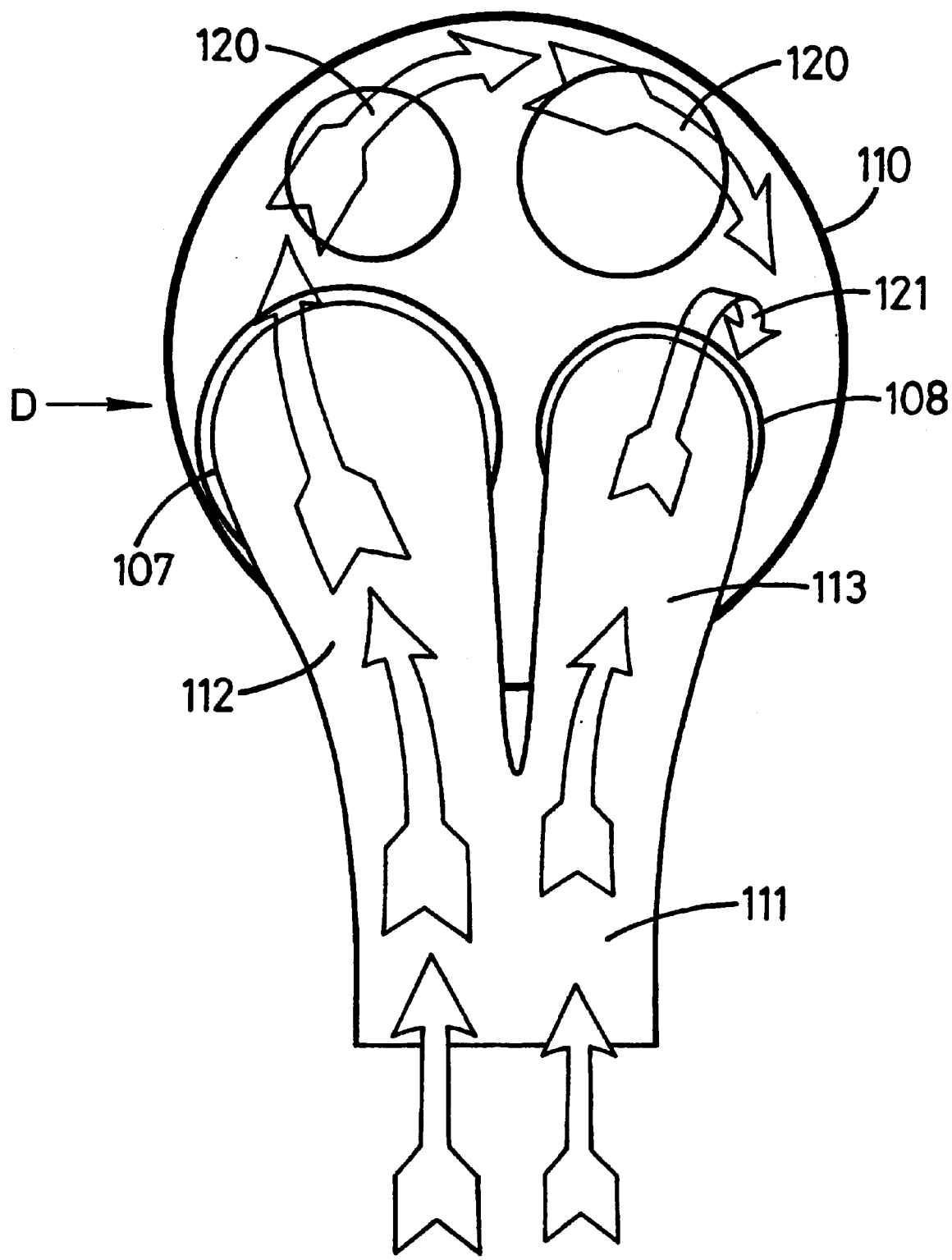
FIG. 5 is a schematic representation of the development of swirl in a four valve cylinder head according to the present invention.

FIG. 5 illustrates how the cylinder head arrangement according to the present invention encourages the development of swirl inside the cylinder head 110. FIG. 5 is a schematic in which the arrows indicate the path of fuel/air mixture 111. The mixture 111 approaches the cylinder head 110 from one side, carried by intake port conduits. The mixture is split into two branches 112 and 113. One branch 112 of the mixture enters the cylinder head via the larger curtain area produced by the larger valve 107. Another branch 113 of the mixture enters via a relatively small curtain area produced by the smaller intake valve 108. Because of the difference in open curtain area, fuel air mixture is admitted at a greater rate by the larger intake valve 107 by the smaller intake valve 108. As the mixture enters the cylinder head interior, the mixture tends to flow to the opposite side of the cylinder head corresponding to the location of the exhaust valves. However, the greater volume of flow entering between the larger intake valve 107 is dominant, and therefore creates a circumferential motion in the mixture which moves the mixture clockwise around the cylinder head as shown by the arrows 120. Needless to say, the flow would be anti-clockwise for a mirrored cylinder head configuration. Mixture entering via the smaller intake valve 108 is drawn clockwise and downwards into the cylinder head interior, as shown by the arrow 121. A helical swirl therefore develops which uniformly fills the cylinder head interior with fuel/air mixture charge, creating an efficient fuel burn during a combustion event.

Figure 6:
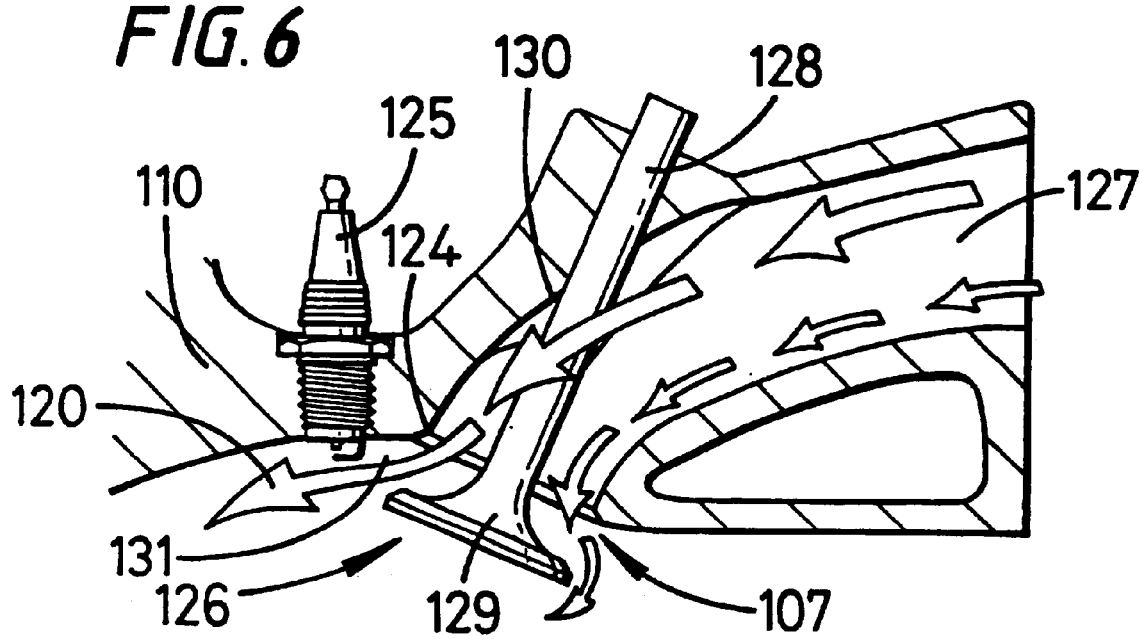
FIG. 6 is a partial section through a roof portion of a cylinder head according to the present invention, through the relatively large first intake valve.

FIG. 6 is a sectional view through a top portion of the cylinder head 110, from a direction D shown in FIG. 5. The Cylinder head has an approximately centrally located sparking plug 125 which has sparking electrodes disposed within the cylinder head interior 126. A large intake conduit 127 leads to the large intake valve 107. A reciprocating valve stem 128 is accommodated within a passage in the cylinder head. The valve stem 128 is formed at a lower end thereof with a valve head 129. The valve head serves to open and close the intake port during running of the engine of which the cylinder head forms a part. The valve is in an open position in FIG. 6. An open valve curtain is defined between the valve head and a valve seat formed along a circumferential surface 124 of the intake port. The conduit 127 provides a shallow approach to the intake port, an upper wall portion 130 of the conduit gently curving downwards to the valve. Because of the shallow approach of the conduit, the bulk of the fuel air mixture tends to pass through an upper portion 131 of the valve curtain. Flow through a lower portion 132 of the valve curtain is less favoured because of the abrupt change in direction required by the mixture. Hence the bulk of the mixture passes across a top region of the interior of the cylinder head, as indicated by the arrow 120.

Figure 7:
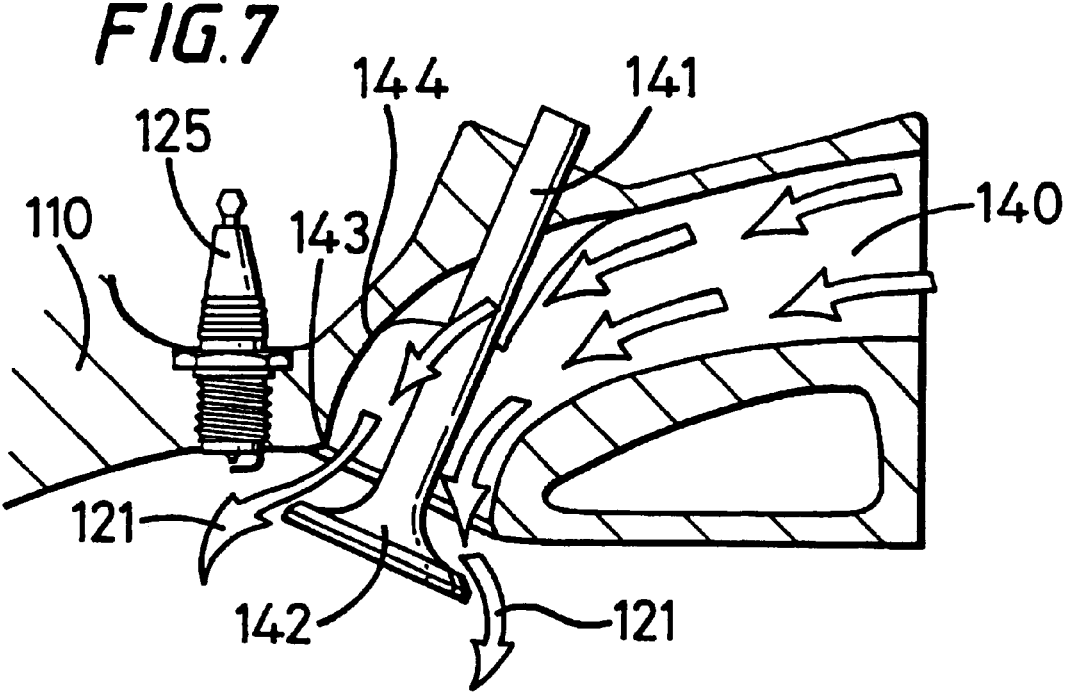
FIG. 7 is a partial section through a roof portion of a cylinder head according to the present invention, through the relatively small second intake valve.

FIG. 7 is another sectional view through a top portion of the cylinder head 110, also from the direction D shown in FIG. 5. A small intake conduit 140 leads to the small intake valve 108. A reciprocating valve stem 141 is accommodated with a passage in the cylinder head. The valve stem 141 is formed with a valve head 142 at a lower end thereof. The valve head serves to open and close the small intake port during running of the engine of which the cylinder head forms a part. The valve is shown in an open position in FIG. 7. An open valve curtain area is defined between the valve head and a valve seat formed along a circumferential surface 143 of the intake port. The conduit 140 provides a relatively steep approach to the intake valve, an upper wall portion 144 of the conduit steeply curving downwards to the valve. Because of the steep approach of the conduit, the fuel air mixture tends to pass relatively evenly through the valve curtain area. Hence the mixture passes down into the interior of the cylinder head, as indicated by the arrows 121.

Figure 12:
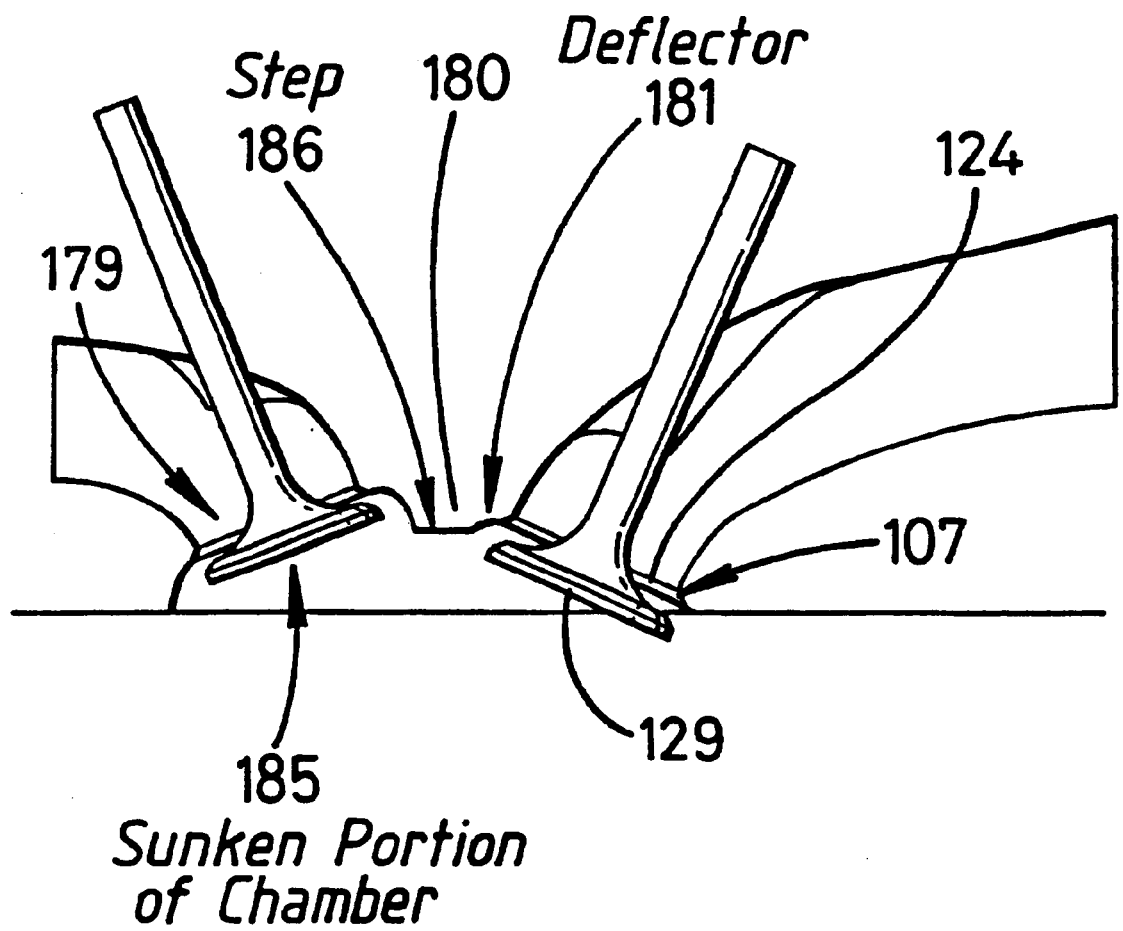
FIG. 12 is a schematic representation of a top end of a combustion chamber in a cylinder head according to the present invention.

FIG. 8 shows the configuration of a typical cylinder head 100 interior top wall surface. The cylinder head comprises two intake valves 103, 104. The valves include a pair of intake valve heads 150,151. The cylinder head also comprises two exhaust valves 101,102. The exhaust valves include two exhaust valve heads 152,153. An outside wall region 154 of the cylinder head forms shrouding around the valves. The shrouding is in the form of a raised lip which provides four filets 155,156,157,158 between the circumferential spacing of each valve. Another prior art cylinder head top wall configuration is shown in FIG. 9. Common features to those of FIG. 12 are numbered alike. The shrouding 154 around each port extends in a thin circumferential lip. The lip is thickened to follow the path of a chord 160 extending in the region of the lip between intake valve 104 on the one hand and the exhaust valve 102 on the other hand. Similarly the lip is thickened along the path of a chord 161 extending between intake valve 103 and exhaust port 101. Neither of these two common configurations is capable of improving mixture motion by producing a swirl in the air/fuel mixture.

Figure 10:
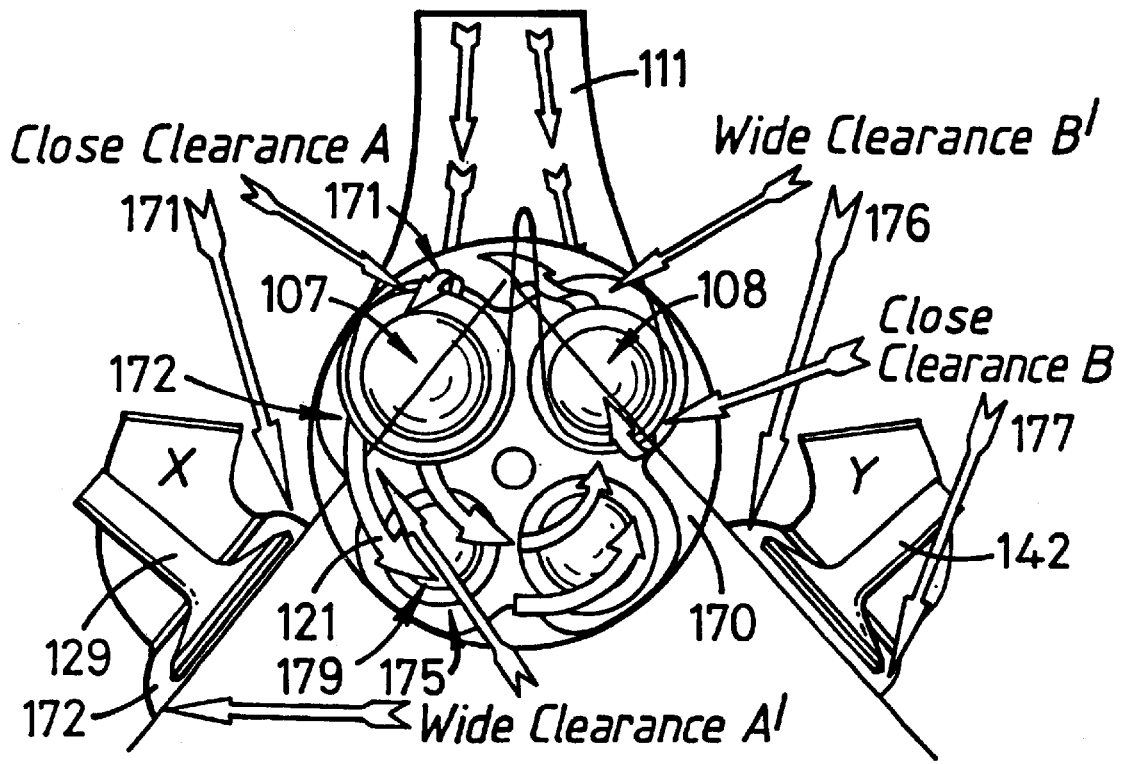
FIG. 10 is a schematic view from the underside of a cylinder head according to the present invention, along with valve sections X and Y illustrating positions of a large intake valve and a smaller intake valve respectively.

A cylinder head interior top wall according to the present invention is shown in FIG. 10. The top wall is viewed from an underside thereof. The view also includes side sectional views X, Y through each of the intake port/valve combinations. Common features to those described in the foregoing with reference to FIGS. 5 and 6 & 7 have been given the same numbering. The top wall is provided with port shrouding 170 of a type similar to that shown in FIG. 8. However, unlike the configuration of FIG. 8, the configuration is formed to develop variations in the clearances between the shrouding at each valve and the valve heads associated with each valve. Mixture is shown flowing from the top of the figure through the intake valves 107,108 and into the interior of the cylinder (combustion chamber). A near side 171 (i.e. near to the intake valve head's circumference) of the large intake valve is shrouded to an extent that, when the valve is open, the clearance between the valve head and the shrouding is relatively low (clearance A), restricting free passage of air there through. Conversely a distal side 172 of the intake valve is shrouded to a lesser extent so that, when the valve is open, the clearance A', between the valve head and the shrouding, is relatively high, thereby encouraging airflow through this region. This large clearance encourages mixture flow via the large intake valve directly into a distal side 175 of the combustion chamber. As this flow of mixture encounters the cylinder internal wall, it is swept around circumferentially thereby developing swirl. A near side 176 of the small intake valve is provided with shrouding which creates a large clearance B'. This large clearance creates a mixture path which permits mixture flow down into the chamber and around in the swirl direction. Conversely the distal side 177 of the small valve port is shrouded to provide a close clearance B. This acts to limit free flow of mixture into the chamber against the swirl direction. The close clearance creates a constricted flow path, which encourages downward flow and permits reversal of the flow direction back in the direction of swirl. Hence the shrouding is shaped to facilitate and enhance the development of swirl in the engine. The downward flow direction corresponding to the mixture flow at the small intake valve imparts a tumble to the mixture, which tumble enhances distribution of the mixture throughout the combustion chamber. The smaller 179 of the two exhaust valves is located adjacent (in terms of swirl direction) the larger 107 of the intake valves. The reduced size of the exhaust valve 179 helps to minimise cross flow during any intake/exhaust overlap period. The small size of the exhaust valve means that cross flow is reduced in the region where it is most likely to occur; i.e. in a region where fresh mixture travels across the roof of the cylinder head combustion chamber adjacent the valve heads. Cross flow is less likely to occur through the other exhaust valve because there is a component of downward motion in the tumbling and swirling mixture and this draws the mixture away from the exhaust valve. Consequently the other exhaust port may be made larger than the adjacent valve, in order to provide a sufficient combined exhaust flow out of the combustion chamber after a combustion event.

Figure 11:
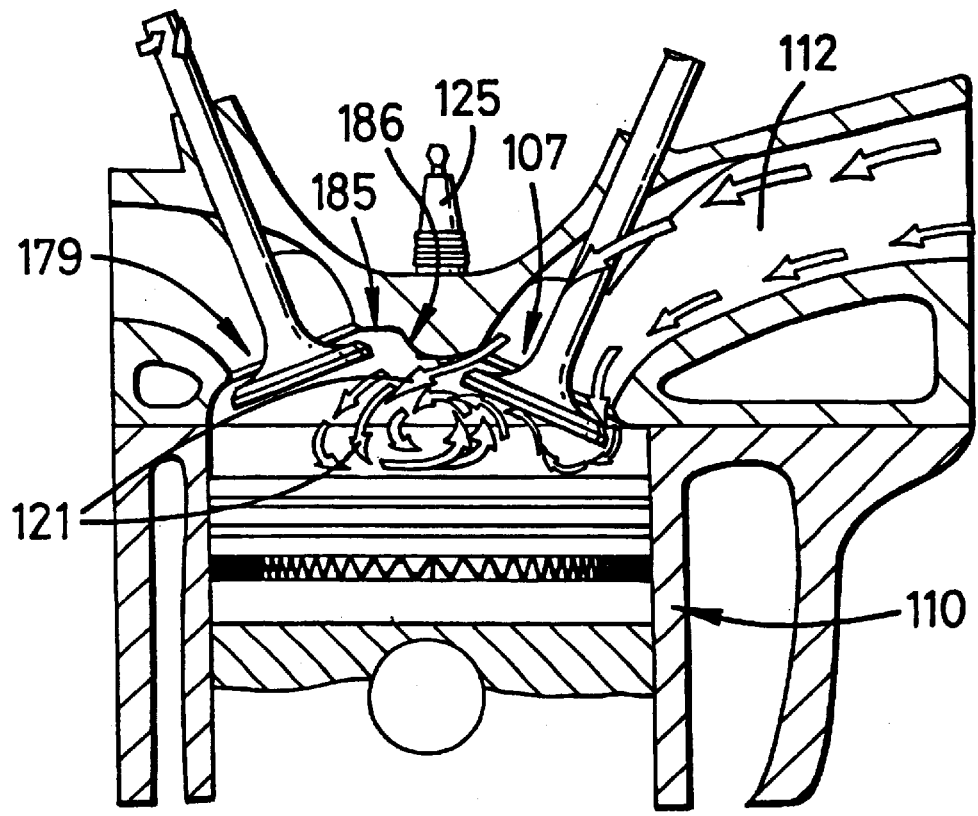
FIG. 11 is a section through a cylinder head according to the present invention.

FIG. 11 shows a cut away sectional view from one side of a variation of the cylinder head arrangement of the present invention. This variation tends to promote further reductions in cross flow. FIG. 11 illustrates the principle structural variations to the cylinder head interior roof profile. The large intake valve 107 is shown open with the valve head 129 spaced apart from the valve seat 124. A distal side of the valve is adjacent an upper wall portion 180 of the cylinder head. This wall portion separates the intake valve 107 from the exhaust valve 179. A region of the wall portion 180 adjacent the distal side of the valve is formed with a concave airflow deflector 181. The deflector acts as a shield which prevents un-burnt fuel/air mixture from passing out of the adjacent open exhaust valve. Fuel/air mixture entering via the distal side of the large valve is deflected by the deflector feature downward into the cylinder head, as shown by arrows 121 in FIG. 11. This directs mixture away from the exhaust valve 179, reducing the tendency for cross flow between the intake and exhaust valves.

In addition, the exhaust valve is recessed into the cylinder head roof. A recess 185 defines a dished space around the exhaust valve seat. In a region of the wall portion adjacent a near side 186 of the exhaust valve the edge of the dish defines a step. This step helps prevent the direct passage of mixture entering through the intake valve out through the exhaust port. The deflector and step together define a tortuous path between the intake 107 and exhaust 179 valves, which path acts to restrict cross flow of fuel/air mixture. The deflector and step together also help create a tumbling airflow (FIG. 11 arrows). This, in conjunction with the helical motion of the interior swirl helps keep un-burnt mixture away from the open exhaust valve during the overlap period of valve opening. The configuration of the recess 185 and deflector 181 are shown more clearly in FIG. 12. The recess serves to form a step 186 which obscures the direct path of air from the intake to the exhaust valve.

Figure 13:
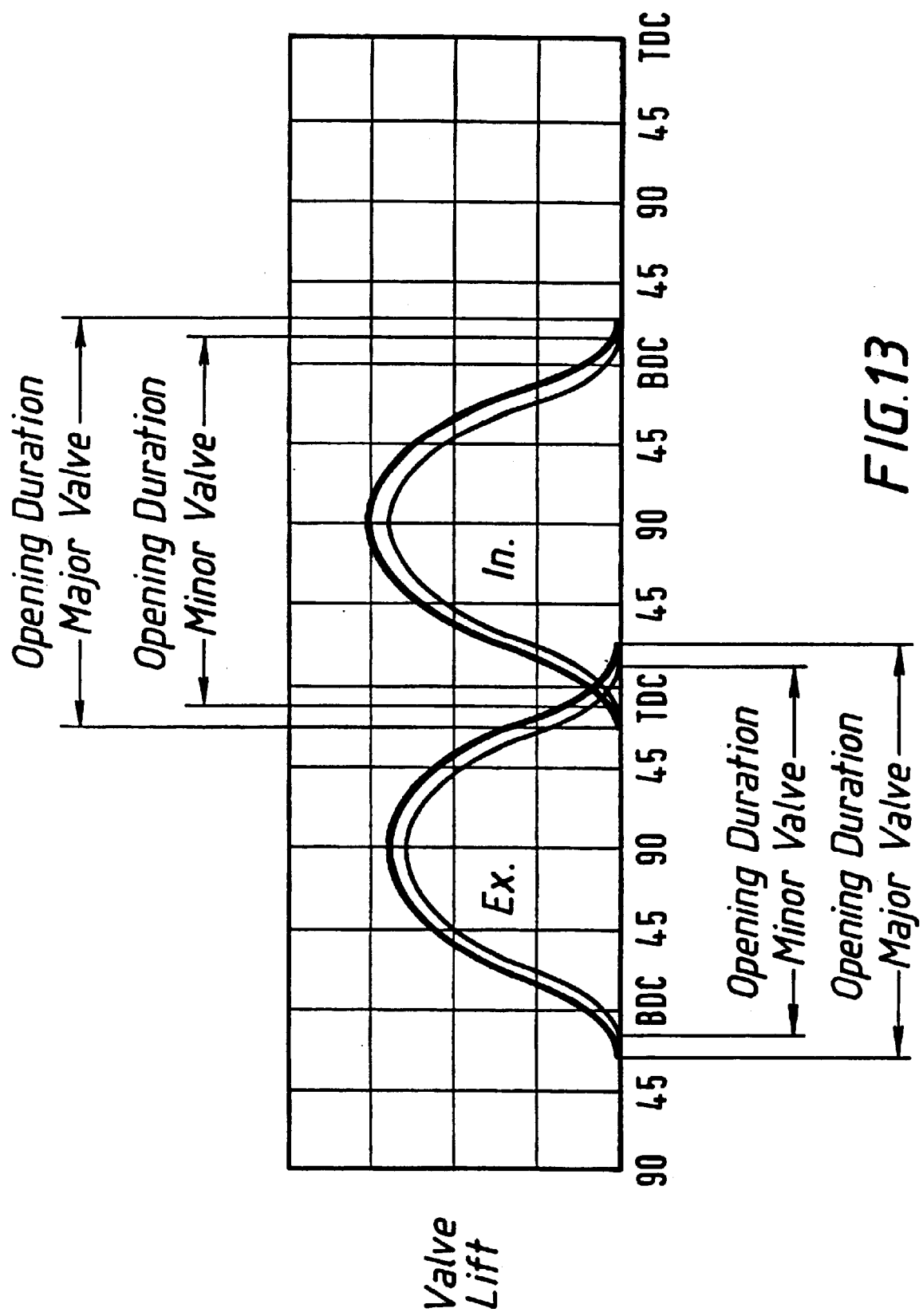
FIG. 13 is a graph showing the variation of valve opening timing and lift in an engine according to the present invention.

Swirl is also encouraged by differential opening and closing of the intake and exhaust valves. FIG. 13 is a graph of valve lift against camshaft rotation in degrees. TDC is an abbreviation for top dead centre and BDC is an abbreviation for bottom dead centre. The valve actuation cams are adjusted to open the large intake valve just before the small intake valve, and close the small intake valve just before the large intake valve. This enhances the differential flow between the two valves because the large intake valve is open for a longer duration than the smaller valve. The graph also shows that the degree of valve lift (i.e. valve head opening displacement) is greater for the large intake valve than the smaller intake valve. Hence the open window for passage of mixture in through the larger valve is further differentiated with respect to the smaller intake valve. The differential valve displacement shown is not essential as the greater part of the swirl effect arises from the timing variation.

These two effects; valve opening timing and valve opening extent, may be used separately or in combination as required. The opening and closing of the exhaust valves may also be differentiated, as shown in FIG. 13. This effect relies upon an efficient exhaust system which ensures that a below atmospheric pressure exists in the exhaust conduit at (or near) the end of the exhaust stroke. If this period corresponds with the opening of the larger exhaust valve, then at the overlap period during which the larger intake valve is opening, mixture will tend to travel diagonally across the cylinder head to the larger exhaust valve because of the lower pressure in that region. This mixture flow is in the correct general direction to swirl some of the mixture, even before the piston has started the intake stroke.

SUMMARY OF THE INVENTION

In a four valve per cylinder head engine according to the present invention, swirl and tumble (and therefore even mixture dispersion in the cylinder head interior) is promoted by a combination of features. These features being different intake port sizes, different exhaust port sizes, shaping of the cylinder head wall around the intake valves to promote mixture flow in the swirl direction, deflection of the airflow from the intake valve away from the exhaust valve, recessing of the exhaust valve seat to reduce crossover, valve opening/closing timing differences to promote swirl, and valve lift variation to promote swirl.

These features may be used separately, but preferably in combination, to produce a more efficient three and four valve engines which have improved performance over a full range of engine revolution speeds.

What is claimed is:

1. An internal combustion engine comprising a cylinder head having formed therein first and second intake valves for admitting combustion charge into a combustion chamber and first and second exhaust valves for expelling combustion products from the combustion chamber, the intake valves being disposed on one side of a roof of the cylinder head and the exhaust valves being disposed on an opposite side of the roof of the cylinder head, each of which valves comprises a port and an associated valve head permitting opening and closing of the port, wherein the valves are arranged in a circumferential sequence as follows: the first intake valve, the first exhaust valve, the second exhaust valve and the second intake valve, characterized by the combination of:

(i) the first intake valve has a larger port bore and valve head diameter than the second intake valve, (ii) the provision of differential valve timing means which act to open the first intake valve before the second intake valve, whereby a greater flow of combustion charge is admitted through the first intake valve as compared to the second intake valve, the differential flow between the two intake valves imparting a swirl to the combustion charge as it enters the combustion chamber, the swirl direction generally corresponding to generally circumferential charge flow in the combustion chamber from the first intake valve, and in sequence past the first exhaust valve, the second exhaust valve and thence past the second intake valve and further characterized in that, (iii) the first exhaust valve has a smaller port bore and valve head diameter than the second exhaust port, whereby cross flow between the large first intake valve and the adjacent first exhaust valve is minimized during swirling of the charge.

2. An engine as claimed in claim 1 wherein a cylinder head wall portion which forms the roof of the combustion chamber accommodates therein the intake and exhaust valves, which roof is provided with shrouding around the first intake valve, the shrouding providing a relatively broad flow path out of the first intake valve at a region of the first intake valve proximal to the adjacent first exhaust valve and a relatively narrow flow path out of the first intake valve at a region of the first intake valve proximal to the adjacent second intake valve, the charge flow thereby being encouraged in the swirl direction and discouraged in an anti-swirl direction.

3. An engine as claimed in claim 1 wherein respective circumferential surfaces of the intake and exhaust valve ports form valve seats for the associated valve heads, wherein the valve seat of the first exhaust port is recessed into a cylinder head roof relative to the valve seat of the first intake port so that the valve seat of the first exhaust port is axially offset in the cylinder head with respect to the valve seat of the first intake port, thereby to present an obscured path for cross flow between the first intake valve and the first exhaust valve.

4. An engine as claimed in claim 1 wherein respective circumferential surfaces of the intake and exhaust valve ports form valve seats for the associated valve heads, wherein the valve seat of the second exhaust port is recessed into the cylinder head roof relative to the valve seat of the second intake port so that the valve seat of the second exhaust port is axially offset in the cylinder head with respect to the valve seat of the second intake port, thereby to present an obscured path for cross flow between the second intake valve and the second exhaust valve.

5. An engine as claimed in claim 3 wherein the exhaust port or ports is/are recessed by an amount equal to between 5 and 20% of the exhaust valve port/head diameter.

6. An engine as claimed in claim 1 characterized in that a deflecting feature is formed on a cylinder head roof or wall portion separating one of the intake valves from one of the exhaust valves, the deflecting feature serving to deflect the flow of combustion charge entering the combustion chamber via the intake valve downwards into the combustion chamber and away from the opposite exhaust valve.

7. An engine as claimed in claim 1 and configured so that a curtain area of the first intake valve when open is larger than a corresponding curtain area of the second intake valve when open.

8. An engine as claimed in claim 7 wherein a valve opening mechanism of the engine is configured to open the first intake valve head by a further distance than the second intake valve head.

9. An engine as claimed in claim 1 wherein differential valve timing means comprises alteration between the relative rotational positions of valve actuation cams for the respective intake valves.

10. An engine as claimed in claim 1 wherein the differential valve timing means is arranged to close the first intake valve before the second intake valve is closed.

11. An engine as claimed in claim 1 wherein one charge conduit to the first intake valve has a shallower angle of approach to the valve than another charge conduit to second intake valve, the said one charge conduit thereby directing charge flow admitted through the first intake valve laterally across the combustion chamber and relatively steep another charge conduit thereby directing charge flow admitted through the second intake valve downwards into the combustion chamber.

12. An engine as claimed in claim 1 wherein the first intake valve is up to 70% larger diameter than the second intake valve.

* * * * *